United States Patent
Yamashita et al.

(10) Patent No.: US 9,360,078 B2
(45) Date of Patent: Jun. 7, 2016

(54) HYDRAULIC SHOCK ABSORBER

(71) Applicant: HITACHI AUTOMOTIVE SYSTEMS, LTD., Hitachinaka-shi, Ibaraki (JP)

(72) Inventors: Mikio Yamashita, Zama (JP); Toru Hosokawa, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/417,424

(22) PCT Filed: Jul. 25, 2013

(86) PCT No.: PCT/JP2013/070241
§ 371 (c)(1),
(2) Date: Jan. 26, 2015

(87) PCT Pub. No.: WO2014/017611
PCT Pub. Date: Jan. 30, 2014

(65) Prior Publication Data
US 2015/0204412 A1  Jul. 23, 2015

(30) Foreign Application Priority Data
Jul. 27, 2012  (JP) ................ 2012-167386

(51) Int. Cl.
*F16F 9/36* (2006.01)
*F16F 13/06* (2006.01)
*F16F 9/18* (2006.01)

(52) U.S. Cl.
CPC . *F16F 13/06* (2013.01); *F16F 9/18* (2013.01); *F16F 9/363* (2013.01)

(58) Field of Classification Search
CPC ............. F16F 9/36; F16F 9/363; F16F 3/364; F16J 15/32
USPC ....................... 188/322.13–322.22
See application file for complete search history.

(56) References Cited

U.S. PATENT DOCUMENTS 4,482,036 A * 11/1984 Wossner ................. F16F 9/364
  188/322.13
5,664,651 A *  9/1997 Miura ..................... F16F 9/363
  188/322.17

(Continued)

FOREIGN PATENT DOCUMENTS

| JP | 2001-330074 | 11/2001 |
| JP | 2003-28226 | 1/2003 |
| JP | 2003-35332 | 2/2003 |
| JP | 2003-130119 | 5/2003 |
| JP | 2003-156093 | 5/2003 |
| JP | 2005-325997 | 11/2005 |

OTHER PUBLICATIONS

International Search Report for PCT/JP2013/070241, mailed Aug. 20, 2013, 3 pages.

(Continued)

*Primary Examiner* — Christopher Schwartz
(74) *Attorney, Agent, or Firm* — Nixon & Vanderhye P.C.

(57) ABSTRACT

In a friction member (22), a base section (92) is constituted by a bottom section (101) and a tube section (102). The bottom section (101) has a bored disk shape, and the tube section (102) has a cylindrical shape extending from an outer circumferential side of the bottom section (101) in the axial direction. An elastic rubber section (91) has a minimum inner diameter section (137), diameter expanding sections (138), (139) which are disposed at each side in the axial direction of the minimum inner diameter section (137). A tube section adhering surface (126) is installed at outer circumferential side of a tube section (102). A cutout section (151) is at least partially formed at a bottom section adhering surface (128) fixed to the bottom section (101) and the tube section (102) side of an open surface at an opposite side in the axial direction, and a deepest section (155) of the cutout section (151) is shallower than a position in the axial direction of the minimum inner diameter section (137).

3 Claims, 9 Drawing Sheets

(56) References Cited

U.S. PATENT DOCUMENTS

| | | | |
|---|---|---|---|
| 6,105,739 A * | 8/2000 | Deppert | F16F 9/363 188/322.17 |
| 2001/0023638 A1 | 9/2001 | Yamaguchi et al. | |

OTHER PUBLICATIONS

Foreign-language Written Opinion of the ISA for PCT/JP2013/070241, mailed Aug. 20, 2013, 3 pages.

* cited by examiner

HYDRAULIC SHOCK ABSORBER

TECHNICAL FIELD

The present invention relates to a hydraulic shock absorber.

This application is the national phase of International Application No. PCT/JP2013/070241, filed on Jul. 25, 2013, which designated the U.S. and claims priority to Japanese Patent Application No. 2012-167386, filed on Jul. 27, 2012, the entire contents of each of which are incorporated herein by reference.

BACKGROUND ART

Among hydraulic shock absorbers, there are hydraulic shock absorbers which have a friction member configured to generate a frictional resistance with respect to a moving piston rod, separately from a sealing member configured to prevent leakage of a working fluid (for example, see the Patent Citation 1, and the Patent Citation 2).

CITATION LIST

Patent Citation

[Patent Citation 1]

Japanese Unexamined Patent Application, First Publication No. 2005-325997

[Patent Citation 2]

Japanese Unexamined Patent Application, First Publication No. 2003-156093

DISCLOSURE OF INVENTION

Technical Problem

In the hydraulic shock absorber, it is desirable to obtain good damping force properties through the friction member.

The present invention provides a hydraulic shock absorber that is capable of obtaining good damping force properties.

Technical Solution

According to one aspect of the present invention, a hydraulic shock absorber includes a cylinder in which a working fluid is sealed therein; a piston slidably fitted into the cylinder and configured to partition an inside of the cylinder into two chambers; a piston rod having one end connected to the piston and the other end extending to an outside of the cylinder; a sealing member configured to come in sliding contact with the piston rod and prevent leakage of the working fluid to the outside of the cylinder; a friction member installed at an inner side of the cylinder than the sealing member and constituted by an annular elastic rubber section in sliding contact with the piston rod and an annular base section to which the elastic rubber section is fixed; and a communication passage configured to reduce a pressure difference between both sides in an axial direction of the friction member. The base section includes a bored disk type bottom section and a tube section extending from an outer circumferential side of the bottom section in the axial direction. The elastic rubber section is provided with a minimum inner diameter section and a diameter expanding section of both sides in the axial direction of the minimum inner diameter section formed at an inner circumferential side of the elastic rubber section. The elastic rubber section is formed with a tube section adhering section which adheres to the tube section in the outer circumferential side, and a cutout section is formed at least partially at the tube section side of an open surface opposite to a bottom section adhering surface fixed to the bottom section in the axial direction. A deepest section of the cutout section is configured to be shallower than a position in the axial direction of the minimum inner diameter section.

The elastic rubber section may be provided with an extending section on the tube section side of the cutout section which extends to a shallower portion than the deepest section in the axial direction. An outer circumferential of the extending section may be the tube section adhering section.

The elastic rubber section may be configured such that an extension surface of a surface of the diameter expanding section close to the bottom section adhering section and an inside surface of the cutout section in the axial direction may approach as being apart from the bottom section adhering section in the axial direction.

Advantageous Effects

According to the hydraulic shock absorber, good damping force properties can be obtained.

BEST MODE FOR CARRYING OUT THE INVENTION

[First Embodiment]

A hydraulic shock absorber according to a first embodiment of the present invention will be described below with reference to the accompanying drawings 1 to 10.

Figure 1:
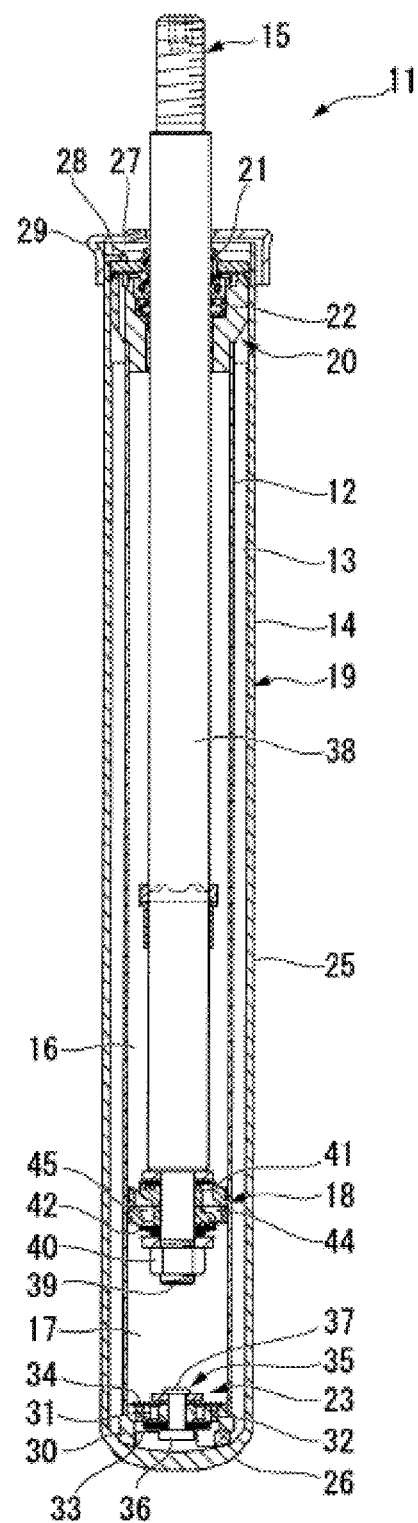
FIG. 1 is a cross-sectional view showing a hydraulic shock absorber according to a first embodiment of the present invention.

A hydraulic shock absorber 11 according to the first embodiment shown in FIG. 1 is a hydraulic shock absorber in which oil is used as a working fluid and is mainly used in the suspension device for the vehicle. The hydraulic shock absorber 11 includes an inner tube 12, an outer tube 14 which has a larger diameter than the inner tube 12, and is disposed concentrically with the inner tube 12 so as to form a reservoir chamber 13 between the inner tube 12 and the outer tube 14, a piston rod 15 which is disposed on a central axis of the inner tube 12 and has one end in the axial direction inserted into the inner tube 12 and the other end in the axial direction extending to an outside from the inner tube 12 and the outer tube 14, and a piston 18 which is connected to one end section in an axial direction of the piston rod 15 and is slidably inserted into the inner tube 12. The piston 18 partitions the inside of the inner tube 2 into two chambers 16 and 17. The hydraulic shock absorber 11 is a dual tube type in which its cylinder 19 has the inner tube 12 and the outer tube 14.

In addition, the embodiment is not limited to the dual tube type but may also be used in a single tube type hydraulic shock absorber. Further, the embodiment is used in a hydraulic shock absorber using a damping force adjusting mechanism.

The piston rod 15 is integrally moved with the piston 18 connected at the one end thereof and the other end of the piston rod 15 protrudes to the outside from the cylinder 19, i.e., from the inner tube 12 and the outer tube 14. The oil is enclosed in the inner tube 12 as the working fluid, and the oil and a high pressure gas are enclosed in the reservoir chamber 13 between the inner tube 12 and the outer tube 14 of the cylinder 19 as the working fluid. In addition, atmospheric pressure air may be enclosed in the reservoir chamber 13 instead of the high pressure gas.

The hydraulic shock absorber 11 has a rod guide 20, a sealing member 21, a friction member 22 and a base valve 23. The rod guide 20 is disposed at an end position of a protrusion side of the piston rod 15 in the cylinder 19. The sealing member 21 is disposed at an outer side (an upper side in an upward/downward direction of FIGS. 1 and 2) with respect to the rod guide 20 in an inward/outward direction (an upward/downward direction of FIGS. 1 and 2, hereinafter referred to as a cylinder inward/outward direction) in the axial direction of the cylinder 19, which is the end section of the cylinder 19. The friction member 22 is disposed at an inner side (a lower side in the upward/downward direction of FIGS. 1 and 2) in the cylinder inward/outward direction with respect to the sealing member 21 and between the sealing member 21 and the rod guide 20. The base valve 23 is disposed at the end section in the axial direction in the cylinder 19 opposite to the rod guide 20, the sealing member 21 and the friction member 22.

All of the rod guide 20, the sealing member 21 and the friction member 22 have annular shapes. The piston rod 15 is slidably inserted into the inside of the rod guide 20, the sealing member 21 and the friction member 22. The rod guide 20 movably supports the piston rod 15 in the axial direction while restricting movement in a radial direction thereof, and guides movement of the piston rod 15. An inner circumferential section of the sealing member 21 comes in sliding contact with an outer circumferential section of the piston rod 15 moving in the axial direction to prevent leakage of the oil in the inner tube 12 and the high pressure gas and oil of the reservoir chamber 13 in the outer tube 14 to the outside. An inner circumferential section of the friction member 22 comes in sliding contact with the outer circumferential section of the piston rod 15 to generate a frictional resistance at the piston rod 15. In addition, the friction member 22 is not provided for the purpose of sealing.

The outer tube 14 of the cylinder 19 has a substantially bottomed cylindrical shape which is constituted by a cylindrical barrel member 25, a bottom section 26 bottom member which closes one end in the axial direction of the barrel member 25 opposite to the side to which the piston rod 15 protrudes and a locking section 28 which protrudes inward in the radial direction from the end position of the opening section 27 in the barrel member 25 at the side in which the piston rod 15 protrudes. A cover 29 is fitted on the side close to the opening section 27 of the outer tube 14 so as to cover the locking section 28 and the sealing member 21.

The inner tube 12 of the cylinder 19 has a cylindrical shape. One end side of the inner tube 12 in the axial direction is fitted into and supported by the base body 30 of the base valve 23 which is disposed inside of the bottom section 26 of the outer tube 14, and the other end side in the axial direction is fitted into and supported by the rod guide 20 fitted inside the opening section 27 of the outer tube 14.

Passages 31 and 32 are formed in the base body 30 of the base valve 23. These passages 31 and 32 are capable of being in communication with the chamber 17 in the inner tube 12 and the reservoir chamber 13 between the outer tube 14 and the inner tube 12. In addition, a disk valve 33 is disposed at the base body 30 at the side close to the bottom section 26, and a disk valve 34 is disposed at the base body 30 at the side opposite to the bottom section 26. The disk valve 33 is a damping valve at a compression side, which is configured to open and close the passage 31 of the outside. The disk valve 34 is a check valve, which is configured to open and close the passage 32 on the outside. The disk valves 33 and 34 are clamped by a head section 36 of one end of a rivet 35 and a swaging section 37 of the other end, and attached to the base body 30.

The disk valve 33 allows a flow of the oil from the chamber 17 toward the reservoir chamber 13 via a passage hole (not shown) of the disk valve 34 and the passage 31 to generate a damping force and restrict the flow of the oil in a reverse direction. On the other hand, the disk valve 34 allows a flow of the oil from the reservoir chamber 13 toward the chamber 17 via the passage 32 with no resistance and restricts a flow of the oil in the reverse direction. The disk valve 33 is a compression side damping valve configured to open a passage 31 when the piston rod 15 is moved to a compression side and the piston 18 is moved to the chamber 17 side to raise a pressure of the chamber 17, and generate a damping force at this time. In addition, the disk valve 34 is a suction valve configured to open the passage 32 when the piston rod 15 is moved to an extension side and the piston 18 is moved to the chamber 16 side to lower the pressure of the chamber 17, but allows a flow of the oil while substantially not generating a damping force from the reservoir chamber 13 into the chamber 17 at this time.

In addition, the damping force of the extension side may be positively generated by the disk valve 34, which is a check valve. In addition, these disk valves 33 and 34 may be omitted to form an orifice.

The piston rod 15 has a main shaft section 38 having a nearly constant diameter and an inner end shaft section 39 at an end close to a side being inserted in the inner tube 12, and has a smaller diameter than the main shaft section 38. A nut 40 is screwed to the inner end shaft section 39. The piston 18 and disk valves 41, 42 on both sides of the piston 18 are fixed to the piston rod 15 through the nut 40.

A plurality of passages 44 and a plurality of passages 45 are formed in the piston 18. These passages 44 and these passages 45 are capable of being in communication with the chamber 17 of the inner tube 12 at the side close to the bottom section 26 and the chamber 16 of the inner tube 12 at the side opposite to the bottom section 26. The disk valves 41, 42 are formed in the piston 18. The compression side disk valves 41 which can close and open the passages 44 is disposed on the side opposite to the bottom section 26, and the extension side disk valves 42 which can close and open the passages 45 fixed on the side close to the bottom section 26.

The disk valve 41 makes the oil flows out of the chamber 17 toward the chamber 16 while restricts a flow of the oil in the reverse direction. Contrarily, the disk valve 42 makes the oil flows out of the chamber 16 toward the chamber 17, while restricts a flow of the oil in the reverse direction. Fixed orifices are installed between the disk valves 41 and the piston 18 which make the chamber 17 in communication with the chamber 16 through the passages 44 while the disk valves 41 is closed. Fixed orifices are also installed between the disk valves 42 and the piston 18 which make the chamber 17 in communication with the chamber 16 through the passages 45 while the disk valves 42 is closed.

When the pressure of the chamber 17 increases by the movement of the piston rod 15 toward the compression side and the movement of the piston 18 toward the chamber 17, in a range in which a speed of the piston 18 is low, the fixed orifices which are not shown let the oil flows from the chamber 17 to the chamber 16 with a constant flow passage area, thereby generates a damping force having an orifice property. In a range in which a speed of the piston is high, the disk valves 41 is apart from the piston 18 to open the passage 44, let the oil flows from the chamber 17 to the chamber 16 with a flow passage area corresponding to the separation amount from the piston, thereby generates the damping force having a valve property.

When the pressure of the chamber 16 increases by the movement of the piston rod 15 toward the extension side and the movement of the piston 18 toward the chamber 16, in a range in which a speed of the piston 18 is low, the fixed orifices which are not shown let the oil flows from the chamber 16 to the chamber 17 with a constant flow passage area, thereby generates a damping force having an orifice property. In a range in which a speed of the piston is high, the disk valves 42 is separated from the piston 18 to open the passage 45, let the oil flows from the chamber 16 toward the chamber 17 with a flow passage are corresponding to the separation amount from the piston, thereby generates the damping force having a valve property.

When the piston rod 15 is moved to the extension side to increase the protruding amount from the cylinder 19, the oil corresponding thereto flows from the reservoir chamber 13 into the chamber 17 via the passage 32 while opening the disk valve 34 of the base valve 23. On the other hand, when the piston rod 15 is moved to the compression side to increase an insertion amount to the cylinder 19, the oil corresponding thereto flows from the chamber 17 into the reservoir chamber 13 via the passage 31 while opening the disk valve 33.

Figure 2:
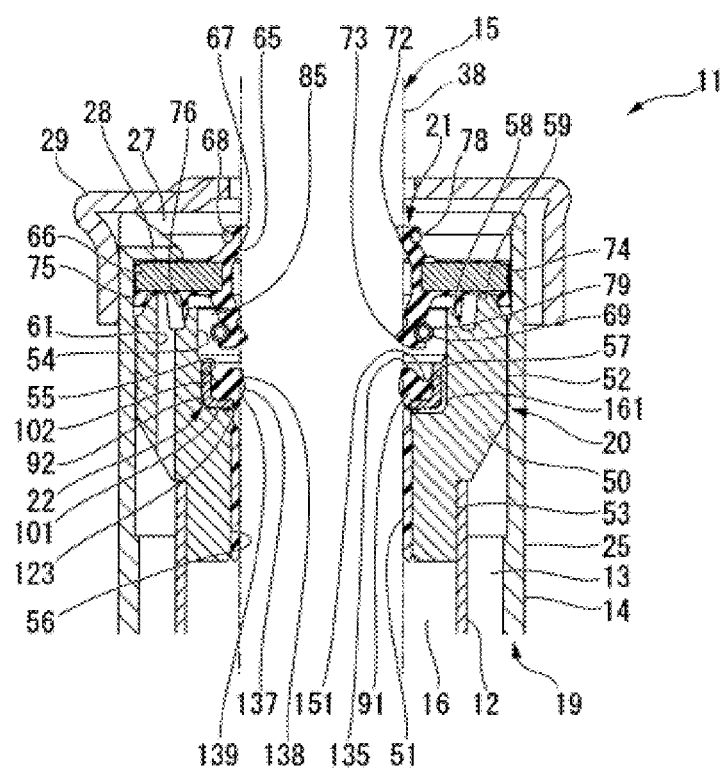
FIG. 2 is a cross-sectional view showing major parts of the hydraulic shock absorber according to the first embodiment of the present invention.

As shown in FIG. 2, the rod guide 20 is constituted by a rod guide main body 50 and a collar 51. The rod guide main body 50 is formed of a metal, and has a substantially stepped cylindrical shape. The collar 51 has a cylindrical shape, and is fitted and fixed to the inner circumferential section of the rod guide main body 50. The collar 51 is formed by coating fluororesin impregnation bronze on a cylindrical shaped inner circumference formed of a metal such as an SPCC or SPCE material.

The rod guide main body 50 has an outer shape having a large diameter outer diameter section 52 formed at one side in the axial direction thereof, and a small diameter outer diameter section 53 formed at the other side in the axial direction and having a smaller diameter than the large diameter outer diameter section 52. The large diameter outer diameter section 52 of the rod guide main body 50 is fitted into the inner circumferential section of the barrel member 25 of the outer tube 14, and the small diameter outer diameter section 53 is fitted into the inner circumferential section of the inner tube 12.

A large diameter hole section 54, an intermediate diameter hole section 55 and a small diameter hole section 56 are formed at a center in the radial direction of the rod guide main body 50. The large diameter hole section 54 is formed at the large diameter outer diameter section 52 side in the axial direction of the rod guide main body 50. The intermediate diameter hole section 55 has a slightly smaller diameter than the large diameter hole section 54, and is formed closer to the small diameter outer diameter section 53 side than the large diameter hole section 54 in the axial direction of the rod guide main body 50. The small diameter hole section 56 has a smaller diameter than the intermediate diameter hole section 55, and is formed closer to the small diameter outer diameter section 53 side than the intermediate diameter hole section 55 in the axial direction of the rod guide main body 50.

A communication groove 57 is formed in the intermediate diameter hole section 55 continuing to an inner circumferential section and a bottom surface thereof. The communication groove 57 is formed in the inner circumferential section of the intermediate diameter hole section 55 throughout the entire length in the axial direction, and formed at the bottom surface of the intermediate diameter hole section 55 throughout the entire length in the radial direction. That is, the communication groove 57 is formed to connect the inner circumferential section of the large diameter hole section 54 and the inner circumferential section of the small diameter hole section 56.

A small diameter annular convex section 58 and a large diameter annular convex section 59 having a larger diameter than the small diameter annular convex section 58 are formed at the end section of the large diameter outer diameter section 52 sides in the axial direction of the rod guide main body 50. A communication hole 61 is formed in the rod guide main body 50 at the large diameter annular convex section 59 side between the large diameter annular convex section 59 and the small diameter annular convex section 58. The communication hole 61 passes through the rod guide main body 50 in the axial direction, and comes in communication with the reservoir chamber 13 between the outer tube 14 and the inner tube 12. The collar 51 is fitted and fixed into the small diameter hole section 56 of the rod guide main body 50. The piston rod 15 is inserted into the rod guide 20 such that the piston rod 15 is in sliding contact with the collar 51 at the outer circumferential section of the main shaft section 38.

The sealing member 21 is disposed at the one end section in the axial direction of the cylinder 19 to be in press contact with the outer circumferential section of the main shaft section 38 of the piston rod 15 in the inner circumferential section. The sealing member 21 restricts leakage of the oil or the like leaked from the gap between the rod guide 20 and the main shaft section 38 of the piston rod 15 to the outside.

The sealing member 21 is constituted by a sealing member main body 67 integrally formed of a seal section 65 and an annular member 66 having an annular shape, an annular spring 68, and an annular spring 69. The seal section 65 is formed of an elastic rubber material having good slidability such as a nitrile rubber or a fluororubber. The annular member 66 is buried in the seal section 65 to maintain a shape of the sealing member 21 to obtain strength for fixing, and formed of a metal. The spring 68 is fitted into the outer circumferential section outside in the cylinder inward/outward direction of the seal section 65 of the sealing member main body 67. The spring 69 is fitted into the outer circumferential section inside in the cylinder inward/outward direction of the seal section 65. In addition, in FIG. 2, the sealing member 21 is shown in a natural state before the piston rod 15 is inserted.

The seal section 65 has a dust lip 72 having an annular tubular shape, and an oil lip 73 having an annular tubular shape, which are disposed inside in the radial direction of the seal section 265. The dust lip 72 extends from the outside in the cylinder inward/outward direction of the inner circumferential side of the annular member 66 in a direction away from the annular member 66 in the axial direction. The oil lip 73 extends from the inside in the cylinder inward/outward direction of the inner circumferential side of the annular member 66 in a direction away from the annular member 66 in the axial direction. In addition, the seal section 65 has an outer circumferential seal 74, and an annular seal lip 75, which are disposed outside in the radial direction of the seal section 65. The outer circumferential seal 74 covers the outer circumferential surface of the annular member 66 at the outer end position in the radial direction of the seal section 65. The seal lip 75 extends from the outer circumferential seal 74 inward in the cylinder inward/outward direction. Further, the seal section 65 has an annular check lip 76. The check lip 76 extends from the inside in the cylinder inward/outward direction of the intermediate portion in the radial direction inward in the cylinder inward/outward direction.

The dust lip 72 has a tapered pipe shape as a whole having an inner diameter that decreases away from the annular member 66 outward in the cylinder inward/outward direction, and an annular groove 78 into which the spring 68 is fitted is formed in the outer circumferential section to be concaved inward in the radial direction.

The oil lip 73 has a tapered pipe shape as a whole having a diameter that decreases away from the annular member 66 inward in the cylinder inward/outward direction, and an annular groove 79 into which the spring 69 is fitted is formed in the outer circumferential section to be concaved inward in the radial direction. In addition, the oil lip 73 has a stepped shape formed inside in the cylinder inward/outward direction of the inner circumferential section.

The sealing member 21 comes in sealing contact with the inner circumferential section of the barrel member 25 of the outer tube 14 in the outer circumferential seal 74 in a state in which the dust lip 72 is disposed outside in the cylinder inward/outward direction, i.e., at the atmospheric air side, and the oil lip 73 is disposed inside in the cylinder inward/outward direction. In this state, in the sealing member 21, a position of the annular member 66 is sandwiched and locked between the large diameter annular convex section 59 of the rod guide 20 and the locking section 28 to which the outer tube 14 is swaged. Here, in the sealing member 21, the seal lip 75 is disposed between the large diameter annular convex section 59 of the rod guide 20 and the outer tube 14 and comes in sealing contact therewith. In addition, the oil lip 73 is disposed in the large diameter hole section 54 of the rod guide 20.

Then, the main shaft section 38 of the piston rod 15 is inserted into the dust lip 72 and the oil lip 73 at the sealing member 21 mounted on the cylinder 19. In this state, one end of the piston rod 15 protrudes from one end of the cylinder 19. In addition, in this state, the dust lip 72 is installed at one end side from which the piston rod 15 of the cylinder 19 protrudes, and the oil lip 73 is installed inside in the cylinder inward/outward direction of the dust lip 72.

The spring 68 fitted into the annular groove 78 of the dust lip 72 holds a clamping force of the dust lip 72 toward the piston rod 15 in an adhering direction in a constant state. In addition, the spring 68 is used to adjust the clamping force to satisfy design specification. The spring 69 fitted into the annular groove 79 of the oil lip 73 adjusts the clamping force of the oil lip 73 toward the piston rod 15 in the adhering direction.

The check lip 76 of the rod guide 20 side of the seal section 65 can come in sealing contact with the entire circumference with a predetermined interference at the outer circumferential side of the small diameter annular convex section 58 of the rod guide 20. Here, the oil leaked from the gap between the rod guide 20 and the piston rod 15 remains in a chamber 85 formed mainly by the large diameter hole section 54 closer to the gap side than the check lip 76 of the sealing member 21. The check lip 76 is opened when the pressure of the chamber 85 is higher than that of the reservoir chamber 13 by a predetermined level, so that the oil remaining in the chamber 85 flows to the reservoir chamber 13 via the communication hole 61. That is, the check lip 76 functions as a check valve configured to allow circulation of the oil and gas only in a direction from the chamber 85 to the reservoir chamber 13 and restrict circulation in a reverse direction.

The dust lip 72 of the sealing member 21 is adhered to the piston rod 15 with the interference thereof and a strained force by the spring 68 to hold air tightness. In addition, the dust lip 72 of the sealing member 21 mainly restricts introduction of foreign substances adhered to the piston rod 15 upon exposure to the outside. The oil lip 73 of the sealing member 21 is adhered to the piston rod 15 with the interference and the strained force by the spring 69 to hold air tightness. In addition, the oil lip 73 of the sealing member 21 mainly restricts leakage of the oil adhered to the piston rod 15 upon introduction into the inner tube 12 of the piston rod 15 to the outside due to the exposure to the outside of the piston rod 15.

The friction member 22 is fitted into the intermediate diameter hole section 55 of the rod guide 20, and thus disposed inside the cylinder 19 more than the sealing member 21. The friction member 22 comes in press contact with the outer circumferential section of the main shaft section 38 of the piston rod 15 in the inner circumferential section thereof, and generates a frictional resistance to the piston rod 15.

The friction member 22 is an integrally formed body constituted by an annular elastic rubber section 91 and an annular base section 92. The elastic rubber section 91 is formed of an elastic rubber material such as a nitrile rubber or a fluororubber, and fixed to the base section 92. The base section 92 is a member formed of a metal material to maintain a shape of the elastic rubber section 91 and to obtain strength for fixing. In addition, in FIG. 2, the friction member 22 is shown in a natural state before the piston rod 15 is inserted (not dug into the piston rod 15).

Figure 3:
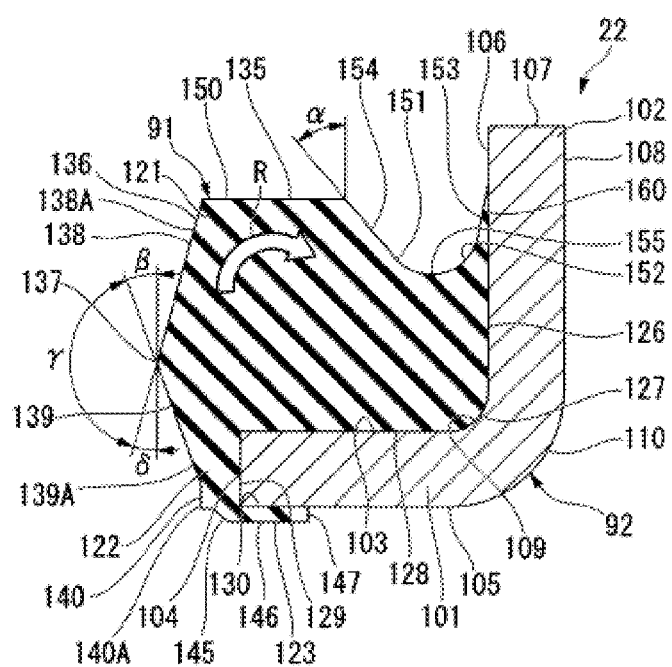
FIG. 3 is a half sectional view showing a friction member of the hydraulic shock absorber according to the first embodiment of the present invention.

As shown in a cross-sectional view of one side in FIG. 3, in the friction member 22, the base section 92 is constituted by a bottom section 101 and a tube section 102. The bottom section 101 has a bored disk shape, and the tube section 102 has a cylindrical shape extending from an outer circumferential side of the bottom section 101 in the axial direction. The bottom section 101 and the tube section 102 coincide with a central axis. In other words, the tube section 102 extends perpendicular to the bottom section 101.

The bottom section 101 has an inner bottom surface 103, an inner end surface 104 and an outer bottom surface 105. The inner bottom surface 103 is constituted by a circular planar surface and is disposed at the tube section 102 side in the axial direction. The inner end surface 104 is constituted by a cylindrical surface and is disposed at an opposite side of the tube section 102 in the radial direction. The outer bottom surface 105 is constituted by a circular planar surface and is disposed at an opposite side of the tube section 102 in the axial direction. An inner circumferential end section of the inner bottom surface 103 is connected to one end section in the axial direction of the inner end surface 104. An inner circumferential end section of the outer bottom surface 105 is connected to the other end section in the axial direction of the inner end surface 104.

The tube section 102 has an inner circumferential section 106, a tip surface 107 and an outer circumferential surface 108. The inner circumferential section 106 is constituted by a cylindrical surface and is disposed at the bottom section 101 side in the radial direction. The tip surface 107 is constituted by a circular planar surface and is disposed at an opposite side of the bottom section 101 in the axial direction. The outer circumferential surface 108 is constituted by a cylindrical surface and is disposed at an opposite side of the bottom section 101 in the radial direction. An end section of the inner circumferential section 106 opposite to the bottom section 101 is connected to an inner diameter section of the tip surface 107. An end section of the outer circumferential surface 108 opposite to the bottom section 101 is connected to an outer diameter section of the tip surface 107. An annular inner R chamfer 109 is formed at an approaching side of the inner bottom surface 103 and the inner circumferential section 106, and an annular outer R chamfer 110 is formed at an approaching side of the outer bottom surface 105 and the outer circumferential surface 108.

The elastic rubber section 91 has an annular shape in which the base section 92 coincides with a central axis, and has a main section 121, an intermediate section 122 and a coating section 123. The main section 121 is formed inside in the radial direction of the tube section 102 of the base section 92 and at the tube section 102 side in the axial direction of the bottom section 101. The intermediate section 122 extends from the end section of the bottom section 101 side in the axial direction of the inner circumferential section of the main section 121 outward in the axial direction, and is formed at the inner circumferential side of the bottom section 101. The coating section 123 extends from an opposite side of the main section 121 outward in the axial direction of the intermediate section 122, and covers a portion of the inner circumferential side of the outer bottom surface 105 of the bottom section 101.

The main section 121 is fixed to the inner circumferential section 106 of the tube section 102 of the base section 92 at a tube section adhering surface 126 of the outer circumferential side. In addition, the main section 121 is fixed to the inner R chamfer 109 of the base section 92 at a corner adhering surface 127 connected to one side in the axial direction of the tube section adhering surface 126. Further, the main section 121 is fixed to the inner bottom surface 103 of the bottom section 101 of the base section 92 at a bottom section adhering surface 128 connected to the corner adhering surface 127 opposite to the tube section adhering surface 126. The intermediate section 122 is fixed to the inner end surface 104 of the bottom section 101 of the base section 92 at an inner circumference adhering surface 129 connected to the bottom section adhering surface 128 opposite to the corner adhering surface 127. The coating section 123 is fixed to the outer bottom surface 105 of the bottom section 101 of the base section 92 at an outer surface adhering surface 130 connected to the inner circumference adhering surface 129.

The elastic rubber section 91 has an open surface 135 in an opposite side in the axial direction of the bottom section adhering surface 128 of the main section 121. The open surface 135 is a surface that is not fixed to the base section 92 but is freely deformable. In addition, the elastic rubber section 91 has an inner circumferential section 136 disposed at the inner circumferential sides of the main section 121 and the intermediate section 122. The inner circumferential section 136 is also a surface that is not fixed to the base section 92 but is freely deformable.

The inner circumferential section of the elastic rubber section 91 has a minimum inner diameter section 137, a diameter expanding section 138, a diameter expanding section 139 and a diameter constant section 140. The minimum inner diameter section 137 has the smallest diameter in the friction member 22. The diameter expanding section 138 is disposed at one side in the axial direction of the minimum inner diameter section 137 and has a tapered shape having a diameter that increases away from the minimum inner diameter section 137. The diameter expanding section 139 is disposed at the other side in the axial direction of the minimum inner diameter section 137 and has a tapered shape having a diameter that increases away from the minimum inner diameter section 137. The diameter constant section 140 has a constant diameter, and is connected to the diameter expanding section 139 opposite to the minimum inner diameter section 137 of an opposite side of the open surface 135 in the axial direction. In other words, the minimum inner diameter section 137, the diameter expanding sections 138 and 139 of both sides in the axial direction of the minimum inner diameter section 137 and the diameter constant section 140 are formed at the inner circumferential side of the elastic rubber section 91. A boundary portion of the diameter expanding sections 138 and 139 configures the minimum inner diameter section 137 in the elastic rubber section 91.

Accordingly, the inner circumferential section 136 of the elastic rubber section 91 is constituted by an inner circumferential surface 138A having a tapered surface shape of the diameter expanding section 138, an inner circumferential surface 139A having a tapered surface shape of the diameter expanding section 139, and an inner circumferential surface 140A having a cylindrical surface shape of the diameter constant section 140. An end section of the inner circumferential surface 138A of the one diameter expanding section 138 opposite to the minimum inner diameter section 137 is connected to the open surface 135. An end section of the inner circumferential surface 139A of the other diameter expanding section 139 opposite to the minimum inner diameter section 137 is connected to the inner circumferential surface 140A of the diameter constant section 140.

The minimum inner diameter section 137 is formed at the main section 121, and a position in the axial direction of the minimum inner diameter section 137 overlaps the tube section 102 of the base section 92. In other words, the position in the axial direction of the minimum inner diameter section 137 is deviated from the bottom section 101 of the base section 92.

The coating section 123 has a chamfer 145, an outer surface 146 and an outer circumferential surface 147. The chamfer 145 is connected to the end section of the inner circumferential surface 140A of the diameter constant section 140 opposite to the diameter expanding section 139, and has a tapered shape having a diameter that increases away from the diameter constant section 140 in the axial direction. The outer surface 146 extends from the end section of the chamfer 145 opposite to the diameter constant section 140 inward in the radial direction, and is constituted by a circular planar surface. The outer circumferential surface 147 forms a cylindrical surface shape disposed at the outer surface 146 opposite to the chamfer 145. That is, as the elastic rubber section 91 is provided with the intermediate section 122 and the coating section 123, the elastic rubber section 91 has a shape surrounding a portion of the bottom section 101 of the base section 92 to an opposite side of the main section 121.

As described above, a central axis of the elastic rubber section 91 coincides with a central axis of the base section 92, specifically, central axes of the open surface 135, the minimum inner diameter section 137, the diameter expanding sections 138 and 139 including the inner circumferential surfaces 138A and 139A, the diameter constant section 140 including the inner circumferential surface 140A, the chamfer 145, the outer surface 146, and the outer circumferential surface 147 coincide with the central axis of the base section 92. The central axis is a central axis of the friction member 22.

A cutout section 151 is formed in the elastic rubber section 91 at the tube section 102 side of the open surface 135 of the main section 121, i.e., outside in the radial direction. The cutout section 151 is formed to be concaved within a range in which the cutout section 151 is formed closer to the bottom section 101 in the axial direction than a main surface section 150 of the open surface 135 and does not reach to the bottom section 101. The main surface section 150 inside in the radial direction of the open surface 135 except for the cutout section 151 has an annular shape about the central axis of the friction member 22. The main surface section 150 has a circular planar surface disposed in a surface perpendicular to the central axis of the friction member 22. The cutout section 151 has an annular shape continued to the entire circumference in the circumferential direction of the friction member 22 about the central axis of the friction member 22, and is formed to overlap positions of the tube section 102 side of the bottom section 101 and the inner R chamfer 109 in the radial direction.

The cutout section 151 is formed to have a depth smaller than a half of a depth in the axial direction of the main section 121. The cutout section 151 has a concave bottom surface 152, an outward extending surface 153 and an inward extending surface 154. The concave bottom surface 152 has an arc shape having a cross section including a centerline of the friction member 22, and is concaved to the bottom section 101 side in the axial direction. The outward extending surface 153 has a tapered shape extending from the end section outside in the radial direction of the concave bottom surface 152 to an opposite side of the bottom section 101 in the axial direction so as to have a diameter that increases away from the bottom section 101. The inward extending surface 154 has a tapered shape extending from the end section inside in the radial direction of the concave bottom surface 152 to an opposite side of the bottom section 101 in the axial direction so as to have a diameter that decreases away from the bottom section 101. The cutout section 151 has a deepest section 155 which has a largest depth disposed at the end section of the bottom section 101 side in the axial direction of the concave bottom surface 152, i.e., at which a bottom position. The concave bottom surface 152, the outward extending surface 153 and the inward extending surface 154 are also formed about the central axis of the friction member 22, and the deepest section 155 also has a circular shape about the central axis of the friction member 22.

The main section 121 of the elastic rubber section 91 has an extending section 160 formed at the tube section 102 side of the cutout section 151. The extending section 160 extends to a position shallower than the deepest section 155 of the cutout section 151 in the axial direction. An inner circumferential section of the extending section 160 is constituted by an outer section in a radial direction of the deepest section 155 of the concave bottom surface 152 and the outward extending surface 153, and an outer circumferential surface is constituted by the tube section adhering surface 126. A tip position in the axial direction of the extending section 160 coincides with the main surface section 150, and is disposed closer to the bottom section 101 than the tip surface 107 of the tube section 102 of the base section 92 by a predetermined amount. In other words, the inner circumferential section 106 of the tube section 102 of the base section 92 is covered with the elastic rubber section 91 including the extending section 160, except for a portion thereof near the tip surface 107.

A depth of the deepest section 155 of the cutout section 151 is shallower than that of the position in the axial direction of the minimum inner diameter section 137. That is, the deepest section 155 is positioned at an opposite side of the bottom section 101 with respect to the minimum inner diameter section 137 in the axial direction of the friction member 22, and overlaps the diameter expanding section 138, which is opposite to the bottom section 101 of the diameter expanding sections 138 and 139.

The elastic rubber section 91 is formed such that an angle α of the inward extending surface 154 inside in the radial direction of the cutout section 151 with respect to the centerline of the friction member 22 is larger than an angle β of the inner circumferential section 139A of the diameter expanding section 139, which is the bottom section adhering surface 128 side of the diameter expanding sections 138 and 139. In other words, an extension surface of the inner circumferential surface 139A of the diameter expanding section 139 of the bottom section adhering surface 128 side opposite to the bottom section 101, and the inward extending surface 154 inside in the radial direction of the cutout section 151 approach in the radial direction away from the bottom section adhering surface 128 in the axial direction. The elastic rubber section 91 is configured such that an angle γ formed between the inner circumferential surface 138A of the diameter expanding section 138 and the inner circumferential surface 139A of the diameter expanding section 139 is 120° or more, and an angle β of the inner circumferential surface 139A with respect to a direction of the centerline of the friction member 22 is larger than an angle δ of the inner circumferential surface 138A.

As shown in FIG. 2, in a state in which the open surface 135 of the elastic rubber section 91 is disposed outside in the cylinder inward/outward direction and the bottom section 101 of the base section 92 is disposed inside in the cylinder inward/outward direction, the friction member 22 having the above-mentioned structure is fitted into the intermediate diameter hole section 55 from the large diameter hole section 54 side of the rod guide 20. Here, in the friction member 22, the tube section 102 of the base section 92 is fitted into the inner circumferential section of the intermediate diameter hole section 55, and the bottom section 101 abuts a bottom surface of the intermediate diameter hole section 55 while deforming the coating section 123 of the elastic rubber section 91.

Then, in the friction member 22 attached to the cylinder 19, the main shaft section 38 of the piston rod 15 is inserted into the elastic rubber section 91 with a predetermined interference. Accordingly, in the friction member 22, the elastic rubber section 91 is elastically deformed outward in the radial direction and adhered to the main shaft section 38 of the piston rod 15. Then, when the piston rod 15 moves in the cylinder inward/outward direction, the elastic rubber section 91 comes in sliding contact therewith. Here, the friction member 22 adjusts frictional properties.

A communication passage 161 is formed between the intermediate diameter hole section 55 of the rod guide 20 and the friction member 22 by the communication groove 57 formed in the intermediate diameter hole section 55 in a state in which the friction member 22 is fitted as described above. The communication passage 161 is in communication with the small diameter hole section 56 side and the large diameter hole section 54 side, i.e., the chamber 85 side, of the rod guide 20. The small diameter hole section 56 side of the rod guide 20 is in communication with the chamber 16 via a micro gap between the collar 51 and the piston rod 15. Accordingly, the communication passage 161 brings the chamber 85 in communication with the chamber 16 to reduce a pressure difference therebetween. In other words, the communication passage 161 brings both sides in the axial direction of the friction member 22 in communication with each other to reduce a pressure difference between both sides in the axial direction of the friction member 22. Accordingly, the friction member 22 does not positively function as a seal. In addition, instead of the communication passage 161, or in addition to the communication passage 161, a communication passage configured to reduce a pressure difference between both sides in the axial direction may be formed at an inner circumference of the friction member 22. Further, even if the communication passage 161 is not always in a communication state, for example, check valves may be installed at both sides in the axial direction of the friction member 22. In other words, the friction member 22 may not be operated as a perfect seal.

In the hydraulic shock absorber described above, as mentioned, when the piston rod 15 moves to the compression side, in the region in which the piston speed is low, the fixed orifices which are not shown generate the damping force having the orifice property. In the region in which the piston speed is high, the disk valve 41 separates from the piston 18 to generate the damping force having the valve property. Further, when the piston 15 moves to the extension side, in the region in which the piston speed is low, the fixed orifices which are not shown generate the damping force having the orifice property. In the region in which the piston speed is high, the disk valve 42 separates from the piston 18 to generate the damping force having the valve property.

In a region in which the piston speed is slower with respect to the hydraulic damping region configured to generate a hydraulic damping force by the disk valves 41 and 42 and the fixed orifices which are not shown, basically the damping force by the disk valves 41 and 42 and the fixed orifices which are not shown is almost never generated. For this reason, an elastic force and a frictional resistance to the piston rod 15 by the sealing member 21 and the friction member 22, which are always generated, and a frictional resistance to the inner tube 12 of the piston 18 become a main source of the damping force. In such a frictional region, an acting force to the piston rod 15 can be appropriately adjusted by setting of the friction member 22.

Figure 10:
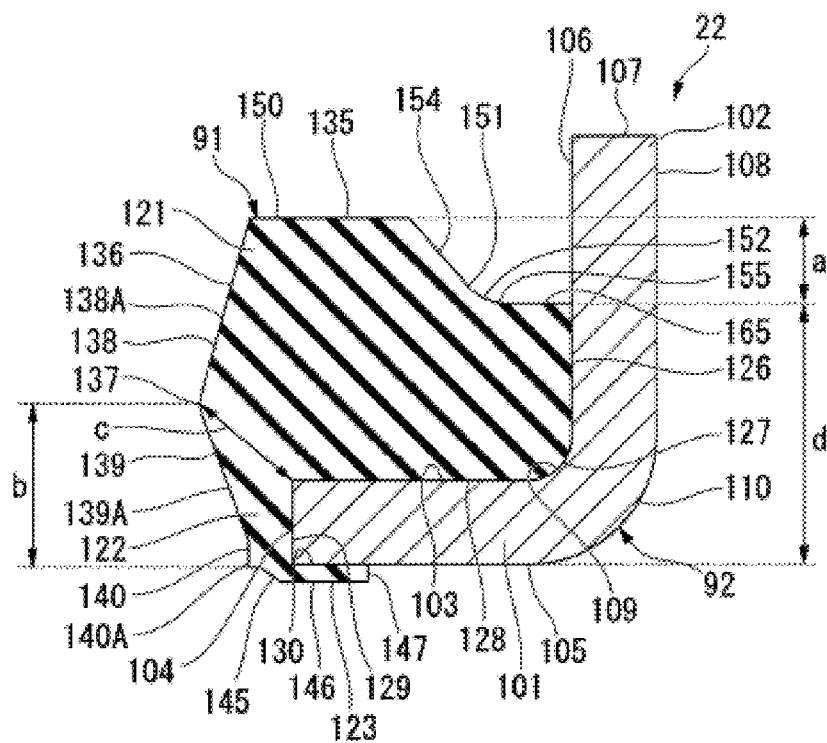
FIG. 10 is a half sectional view showing a modified example of the friction member of the hydraulic shock absorber according to the first embodiment of the present invention.

Patent Citation 1, discloses a friction member formed through vulcanized adhesion of a frictional body having a gap with a cylindrical section and formed of an elastic rubber material to a metallic annular bottom section having a bottomed cylindrical shape which has a bottom section and a cylindrical section (see FIG. 10, of Patent Citation 1). In addition, Patent Citation 2, discloses a friction member, which is different from the above-mentioned friction member, formed by baking of rubber such that a gap with a cylindrical section is not formed in a bottomed cylindrical core bar constituted by a bottom section and the cylindrical section (see FIG. 6(D) of Patent Citation 2).

In the shock absorber using such a friction member, in the frictional region in which the piston speed starts from 0, the friction member generates a spring force by elastic deformation of rubber without generating sliding with the piston rod, and the spring force becomes an acting force (a dynamic spring region). After that, when the piston rod moves to a certain extent (0.1, mm) or more, sliding occurs between the friction member and the piston rod, and a dynamic frictional force occurs (a dynamic frictional region).

In recent development, as the dynamic spring region in the frictional region is expanded and the dynamic frictional region is reduced, connection to the hydraulic damping region becomes smooth and an inclination of an increase in damping force with respect to an increase in piston speed can be increased. As a result, it will be appreciated that rough vibrations of a high frequency are suppressed to improve riding comfort, and a force at the beginning or end of roll is generated to further improve handling stability.

However, as disclosed in Patent Citation 1,, when the frictional body is formed to have a gap with the metallic annular cylindrical section, since stiffness of the frictional body is low and the frictional body is rapidly slid with respect to movement of the piston rod 15, the dynamic spring region in the frictional region is reduced, and the dynamic frictional region is increased. For this reason, the damping force is constant until entering the hydraulic damping region, and cannot be smoothly connected to the hydraulic damping force. In addition, an inclination of an increase in damping force with respect to an increase in piston speed in a region in which the piston speed is 0, to a very low speed is small, and an effect of the dynamic spring region is also small. Further, as disclosed in Patent Citation 2,, when rubber is installed not to form a gap with the cylindrical section of the core bar, as a force of pressing the rubber against the piston rod is increased, an inclination of an increase in damping force with respect to an increase in piston speed in a region in which the piston speed is 0, to a very low speed is increased, but a force to start sliding the frictional body with respect to movement of the piston rod 15 is increased, it is difficult to deform the rubber. As a result, a stroke until sliding is small, the dynamic spring region is not very large, a frictional resistance at the beginning of sliding is abruptly decreased, and the damping force becomes constant until entering the hydraulic damping region and cannot be smoothly connected to the hydraulic damping force. Improvement of the damping force properties until entering the hydraulic damping region, i.e., upon the slight amplitude, slight vibrations and radio frequency, is required.

According to the hydraulic shock absorber 11 of the first embodiment, in the elastic rubber section 91 of the assembled friction member 22, the deepest section 155 of the cutout section 151 formed at the tube section 102 side of the open surface 135 in an opposite direction of the axial direction of the bottom section adhering surface 128 is shallower than the position in the axial direction of the minimum inner diameter section 137 between the diameter expanding sections 138 and 139 of both sides in the axial direction of the inner circumferential side. Accordingly, a compressive force to the piston rod 15 is increased by an extent to which a depth of the cutout section 151 is reduced, and an inclination of an increase in damping force with respect to an increase in piston speed in the dynamic spring region is increased. In addition, until entering the hydraulic damping region, while the minimum inner diameter section 137 configured to generate the highest compressive force is adhered to the piston rod 15, the main section 121 is deformed to rotate about the deepest section 155 by movement of the piston rod 15 as shown by an arrow R of FIG. 3, and thus a region (a stroke) in which a dynamic spring force is generated is increased without sliding with respect to the piston rod 15. Accordingly, the dynamic frictional region is reduced, the properties are varied such that the damping force is smoothly increased with respect to the increase in piston speed and smoothly connected to the hydraulic damping force, and thus good damping force properties can be obtained. Accordingly, in particular, damping force properties upon the slight amplitude, slight vibrations and high frequency can be improved, and the riding comfort and handling stability of a vehicle on which the hydraulic shock absorber is mounted can be improved. In addition, while a plurality of sets of friction members may be used to increase the inclination of the increase in damping force of the related art, since the inclination of the increase in damping force can be increased by one friction member 22, cost can be reduced in comparison with the case in which the plurality of friction members are assembled, and a basic length can also be reduced. In addition, while the dynamic spring region cannot be substantially increased even when the plurality of friction members is assembled, in the first embodiment, the dynamic spring region can be increased. In addition, the plurality of sets of friction members 22 of the first embodiment may be used according to requirements of a hydraulic shock absorber.

Figure 4A:
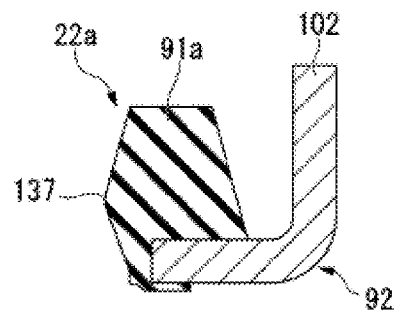
FIG. 4A is a half sectional view showing another friction member for the purpose of comparison.
Figure 4B:
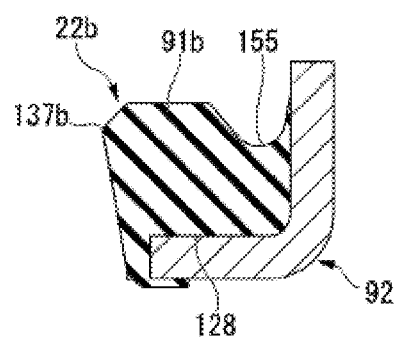
FIG. 4B is a half sectional view showing another friction member for the purpose of comparison.
Figure 4C:
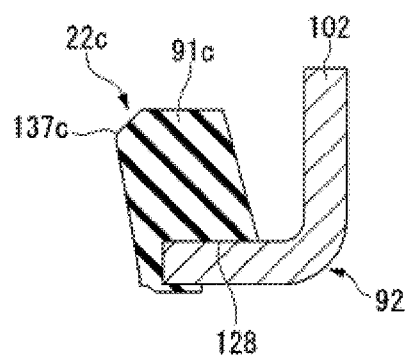
FIG. 4C is a half sectional view showing another friction member for the purpose of comparison.
Figure 4D:
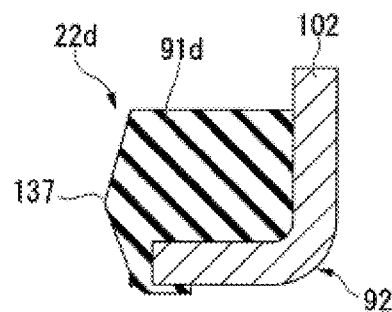
FIG. 4D is a half sectional view showing another friction member for the purpose of comparison.

Specifically, for cases that the friction member 22 of the hydraulic shock absorber 11 according to the first embodiment and friction members of comparative examples shown in FIGS. 4A to 4D are assembled, properties of the damping force with respect to the piston speed were obtained by experiments. In addition, the comparative example shown in FIG. 4A is a friction member 22a, (corresponding to a member shown in FIG. 10, of Patent Citation 1) having an elastic rubber section 91a, with a gap with the entire tube section 102 of the base section 92, unlike the first embodiment. The comparative example shown in FIG. 4B is a friction member 22b, having an elastic rubber section 91b, in which a minimum inner diameter section 137b, is disposed at an opposite side of the bottom section adhering surface 128 with respect to the deepest section 155, unlike the first embodiment. The comparative example shown in FIG. 4C is a friction member 22c, in which an elastic rubber section 91c, is installed to have a gap with the entire the tube section 102 of the base section 92 and a minimum inner diameter section 137c, is deviated at an opposite side of the bottom section adhering surface 128, unlike the first embodiment. The comparative example shown in FIG. 4D is a friction member 22d having an elastic rubber section 91d, with no gap and no cutout section with the tube section 102 of the base section 92. In addition, the friction member 22d, corresponds to the member shown in FIG. 6(D) of Patent Citation 2.

Figure 5:
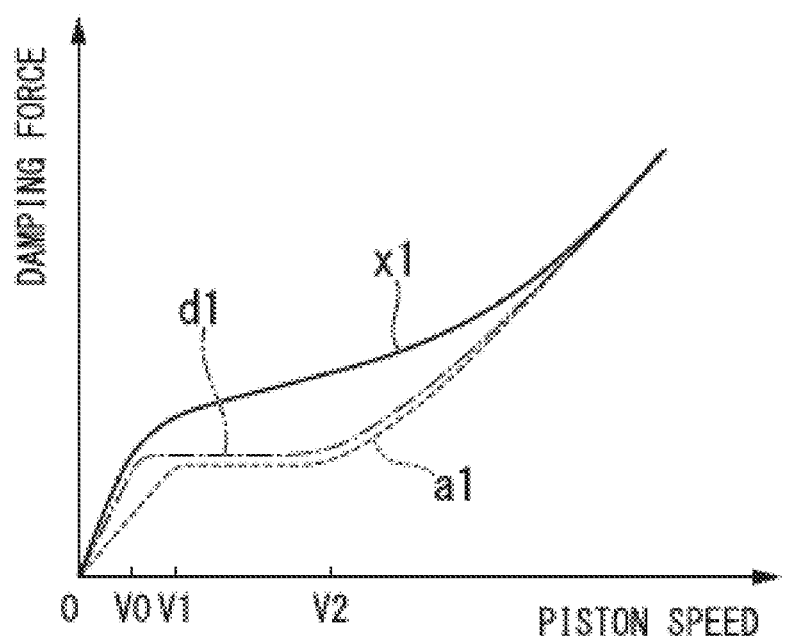
FIG. 5 is a property diagram showing a relationship of a damping force with respect to a piston speed of the hydraulic shock absorber according to the first embodiment of the present invention and the hydraulic shock absorber using the other friction member.

As a result, as shown by a broken line a1 of FIG. 5, in all of the friction members 22a,, 22b, and 22c,, in the region in which the piston speed is 0, to a very low speed V1, while a spring force by elastic deformation of the elastic rubber section 91 is generated at the dynamic spring region in the frictional region without sliding of the elastic rubber section 91 with respect to the piston rod, since the outer diameter side of the minimum inner diameter section 137 becomes a vacant space, a pressing force is low and an inclination of an increase in damping force with respect to an increase in piston speed is small. After that, a section from V1, to V2, shows properties in the dynamic frictional region of the frictional region in which the elastic rubber section 91 slides with respect to the piston rod to be in the dynamic frictional state, and the damping force is constant. In addition, when the piston speed is V2, or more, it enters the hydraulic damping region, and the damping force by an orifice or a damping valve overlaps the above-mentioned dynamic friction to be dominant. Variation in boundary between the section from V1, to V2, and the hydraulic damping force having the piston speed of V2, or more was increased, and could not be smoothly connected to the hydraulic damping force having the piston speed of V2, or more.

That is, when the elastic rubber section 91a, is installed to have a gap with the entire tube section 102 of the base section 92 like the friction member 22a,, the elastic rubber section 91a, enters the gap upon compression against the piston rod 15 to reduce the stiffness, and the above-mentioned deformation due to rotation cannot easily occur. Accordingly, due to instantly slide with respect to the piston rod 15, the damping force becomes constant. In addition, when the minimum inner diameter section 137b, of the elastic rubber section 91b, is deviated at an opposite side of the bottom section adhering surface 128 like the friction member 22b,, since a portion far from the base section 92 comes in sliding contact with the piston rod 15 with a large compressive force, deformation of the portion having a small stiffness is increased, and the above-mentioned deformation due to rotation cannot easily occur. Accordingly, due to instantly slide with respect to the piston rod 15, the damping force becomes constant.

In addition, in the friction member 22d,, the stiffness of the elastic rubber section 91d, is increased, and as shown by a chain line d1 of FIG. 5, in the region in which the piston speed is 0, to a very low speed V0, the spring force by the elastic deformation of the elastic rubber section 91 is generated in the dynamic spring region of the frictional region without sliding of the elastic rubber section 91 with respect to the piston rod. Here, while the inclination of the increase in damping force with respect to the increase in piston speed is increased as a force of pressing the elastic rubber section 91d, is increased, since there is no vacant space at the outside, deformation due to rotation as described in the first embodiment hardly occurs, and sliding instantly occurs (earlier than V1).

After that, in the section from V0, to V2,, in the dynamic frictional region of the frictional region, the elastic rubber section 91 slides with respect to the piston rod to be in the dynamic frictional state, and the damping force becomes constant. In addition, when the piston speed is V2, or more, it enters the hydraulic damping region, and the damping force by the orifice or the damping valve overlaps the above-mentioned dynamic friction to become dominant. Variation in boundary between the section from V0, to V2, and the hydraulic damping force having the piston speed of V2, or more was increased, and could not be smoothly connected to the hydraulic damping force having the piston speed of V2 or more.

On the other hand, in the friction member 22 of the first embodiment, as shown by a solid line x1 of FIG. 5, in the region in which the piston speed is 0, to a very low speed V2, the spring force by the elastic deformation of the elastic rubber section 91 is generated in the dynamic spring region of the frictional region without sliding of the elastic rubber section 91 with respect to the piston rod. Here, as a force of pressing the elastic rubber section 91 is increased, an inclination of an increase in damping force with respect to an increase in piston speed is increased.

After that, before and after V2,, the elastic rubber section 91 slides with respect to the piston rod to be in the dynamic frictional state, and the damping force becomes constant. In addition, when the piston speed is V2, or more, it enters the hydraulic damping region, and the damping force by the orifice or the damping valve overlaps the above-mentioned dynamic friction to become dominant. Accordingly, the piston speed can be smoothly connected to the hydraulic damping force from V0, to V2. As a result, good damping force properties can be obtained, and riding comfort and handling stability of the vehicle on which the hydraulic shock absorber is mounted can be improved. In addition, when the minimum inner diameter section 137 approaches the bottom section adhering surface 128 too much, stress is increased near the base section 92 and durability is decreased.

Further, in the first embodiment, while the example in which there is no dynamic frictional region has been described, the present invention is provided to increase the dynamic spring region, and the dynamic frictional region may be formed according to product specification.

As described above, as will be apparent from the result of the experiment, when the gap is entirely formed between the tube section 102 of the base section 92 and the elastic rubber section, a pressing force is insufficient, and when the entire space between the tube section 102 of the base section 92 and the elastic rubber section is buried, while the pressing force can be increased, since deformation in the rotational direction cannot occur, the dynamic spring region cannot be easily increased.

Here, when the minimum inner diameter section 137b, is disposed at an opposite side of the bottom section adhering surface 128 with respect to the deepest section 155, unlike the first embodiment, i.e., FIG. 4B, in order to verify why the dynamic spring region cannot be increased, simulation of the stress was performed. The result is shown in FIGS. 6A and 6B.

Figure 6A:
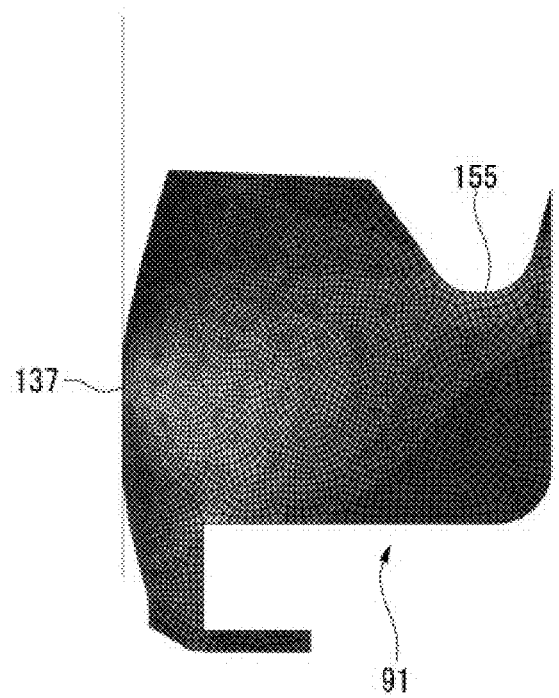
FIG. 6A is a simulation result of a stress distribution of the friction member of the hydraulic shock absorber according to the first embodiment of the present invention.
Figure 6B:
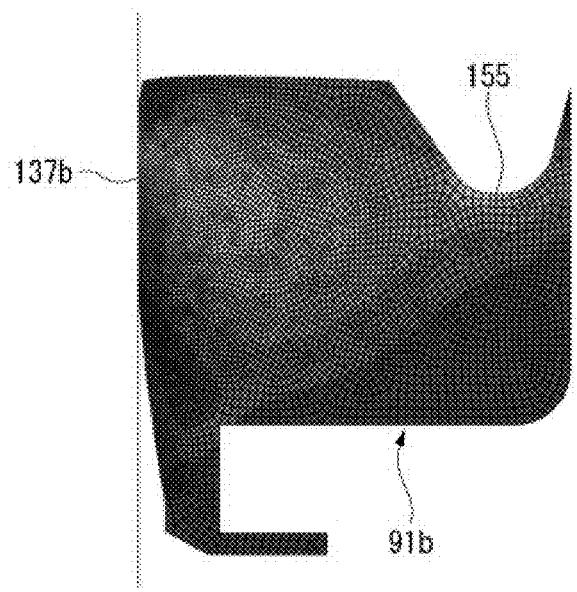
FIG. 6B is a simulation result of a stress distribution of the other friction member.

FIGS. 6A and 6B are simulation results showing stress distribution generated in the elastic rubber section 91 when the friction member comes in sliding contact with the outer circumferential section of the piston rod having φ=12.5, and µ=0.3. Stress is increased as color whitens, and stress is decreased as color darkens. In addition, the present invention is not limited to a numerical dimension and a frictional coefficient.

FIG. 6A shows the first embodiment, and FIG. 6B shows the comparative example of FIG. 4B.

In the elastic rubber section 91 shown in FIG. 6A, which is the friction member 22 of the first embodiment, a white portion is concentrated near the minimum inner diameter section 137 in sliding contact with the piston rod, so that it is assumed that stress concentration occurs. In addition, stress also occurs even in the deepest section 155 and a portion having high stress in comparison with the surrounding thereof is formed obliquely from the vicinity of the minimum inner diameter section 137 to the deepest section 155.

From this, as the piston rod extends, even when the minimum inner diameter section 137 moves upward, since the deepest section 155 approaches a portion having high stress to further increase the stress, a sufficient pressing force is maintained.

Accordingly, it is presumed that the elastic rubber section 91 can maintain a static friction state with respect to the piston rod while maintaining the rotational deformation, and as a result, the dynamic spring region was increased.

On the other hand, in the elastic rubber section 91b, shown in FIG. 6B, the high stress area is concentrated in a leftward and rightward direction of FIG. 6B in a region from a contact portion with the piston rod near the minimum inner diameter section 137b to the deepest section 155. Different from FIG. 6A, since the high stress area spreads in a substantially radial direction (the leftward and rightward direction of FIG. 6B), when the minimum inner diameter section 137 moves upward as the piston rod extends, since the deepest section 155 goes away from the high stress area, the stress is decreased, a sufficient pressing force cannot be obtained, and the static friction state cannot be maintained. For this reason, it is presumed that the rotational deformation of the elastic rubber section 91 is also reduced, and as a result, the dynamic spring region is insufficiently spread.

Further, from the fact that the contact portion with the piston rod is not quite white and the stress is low, it is presumed that the dynamic spring region is insufficiently spread.

Figure 7:
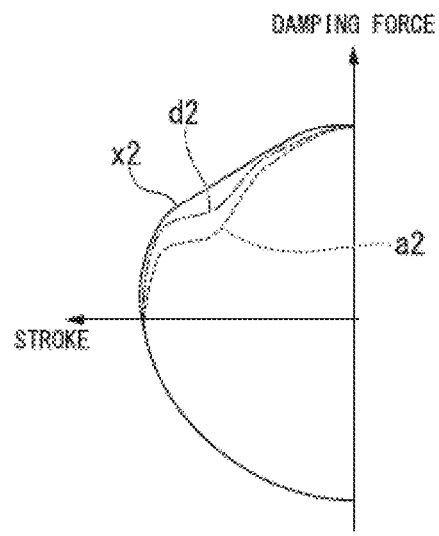
FIG. 7 is a Lissajous waveform showing a relationship between a stroke and a damping force of the hydraulic shock absorber according to the first embodiment of the present invention and the hydraulic shock absorber using the other friction member.

Reviewing the Lissajous waveform showing the relation between the stroke of the piston rod and the damping force shown in FIG. 7, when either of the friction members 22a,, 22b, and 22c, is used, a large step difference is generated when the damping force is raised, as shown by a broken line a2 of FIG. 7. When the friction member 22d is used, as shown by a chain line d2 of FIG. 7, a slightly reduced step difference occurs. On the other hand, when the friction member 22 of the first embodiment is used, as shown by a solid line x2 of FIG. 7, a smooth Lissajous waveform having almost no step difference is shown. In addition, since the damping force is smoothly varied as the Lissajous waveform becomes smooth, it is preferable. If the damping force is not smoothly varied, a passenger may feel a sense of discomfort due to the disturbed area.

Figure 8:
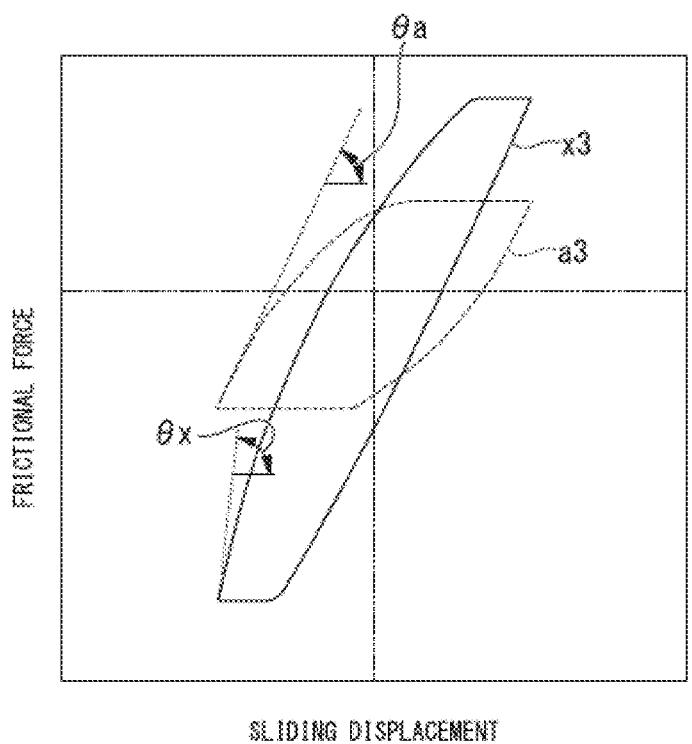
FIG. 8 is a property diagram showing a simulation result of static frictional properties of the friction member of the hydraulic shock absorber according to the first embodiment of the present invention and the other friction member as a relationship of a frictional force with respect to sliding displacement.

FIG. 8 is a simulation result of static frictional properties, showing a relation of a frictional force with respect to sliding displacement. The friction member 22 of the first embodiment having properties shown by a solid line x3 of FIG. 8 can obtain large static frictional properties in comparison with the friction members 22a,, 22b, and 22c, having properties shown by a broken line a3 of FIG. 8, and further, the stiffness is increased and an initial inclination θx can be increased in comparison with an inclination θa of the friction members 22a,, 22b, and 22c.

Figure 9:
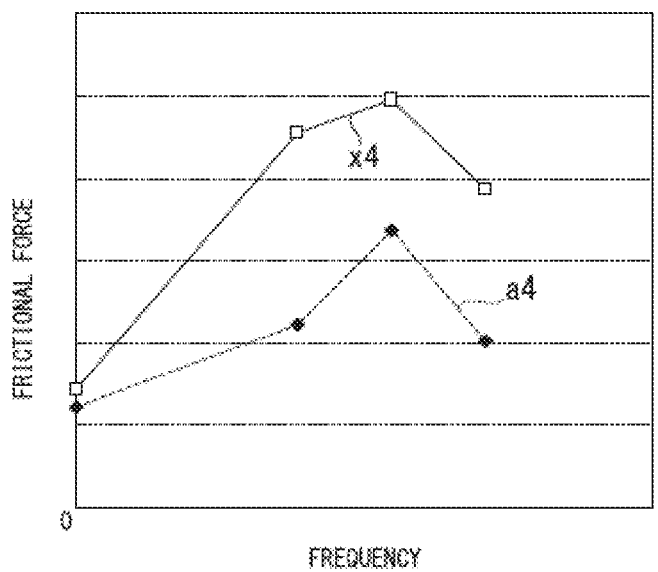
FIG. 9 is a property diagram showing an experiment result of dynamic frictional properties of the friction member of the hydraulic shock absorber according to the first embodiment of the present invention and the other friction member as a relationship of a frictional force with respect to a frequency.

As the stiffness of the friction member 22 is increased, a dynamic spring constant upon a slight amplitude operation of the hydraulic shock absorber 11 is increased, and improvement of the dynamic frictional properties becomes possible. FIG. 9 is an experiment result of dynamic frictional properties, showing a relation of a frictional force with respect to a frequency. When the friction member 22 of the first embodiment having properties shown by a solid line x4 of FIG. 9 has a high frequency in comparison with the friction members 22a,, 22b, and 22c, having properties shown by a broken line a4 of FIG. 9, the frictional force of the dynamic frictional properties can be increased. Accordingly, damping of the slight vibrations of the region in which damping cannot be performed by the hydraulic damping force of the hydraulic shock absorber 11 can be performed. Accordingly, good damping force properties can be obtained, and riding comfort and handling stability of the vehicle on which the hydraulic shock absorber is mounted can be improved. In the riding comfort, beginning of running of the vehicle on which the hydraulic shock absorber is mounted becomes smooth, and cornering feeling caused by abrupt variation in damping force and shaking and rattling feeling transmitted from a road surface to the vehicle body can be reduced.

Since the elastic rubber section 91 is provided with the extending section 160 disposed at the tube section 102 side of the cutout section 151 and extending to a shallower position in the axial direction than the deepest section 155, manufacturing thereof becomes easy. In addition, as shown in FIG. 10, even when a bottom surface section 165 parallel to the main surface section 150 is formed from the deepest section 155 of the cutout section 151 to the tube section 102 without forming the extending section 160, as described above, the properties of the solid lines x1 to x4 shown in FIGS. 5 to 9 can be obtained. In addition, the size of the elastic rubber section 91 will be described with reference to FIG. 10. In FIG. 10, "a" represents 1.0, mm, "b" represents 1.9, mm, "c" represents 1.4, mm, and "d" represents 3.1, mm. It will be apparent from the experiment result that, even when only the length in the axial direction of the main section 121 of the elastic rubber section 91 shown in FIG. 10 is increased, the inclination of the increase in damping force or the damping force properties are substantially equal. In addition, the present invention is not limited to the numerical dimension and frictional coefficient.

In the elastic rubber section 91, since the extension surface of the inner circumferential section 139A of the diameter expanding section 139 of the bottom section adhering surface 128 side and the inward extending surface 154 inside in the radial direction of the cutout section 151 approach each other in the radial direction away from the bottom section adhering surface 128 in the axial direction, even when the elastic rubber section 91 is compressed outward in the radial direction by the piston rod 15, the cutout section 151 can be appropriately maintained and good properties described above can be obtained. That is, when an angle α of the inward extending surface 154 inside in the radial direction of the cutout section 151 is reduced, stiffness of the inner circumferential side is decreased, and when increased, the main section 121 cannot be easily rotated. In order to increase a stroke by compression involving the above-mentioned rotation, the angle α may be larger than an angle β of the inner circumferential surface 139A of the diameter expanding section 139 of the bottom section adhering surface 128 side.

While the stroke until the friction member 22 of the first embodiment enters the hydraulic damping region is about ±0.5, mm, as the dynamic spring constant upon such a slight amplitude is improved, various effects such as a smooth start of a steering handle or smooth end of roll upon entering a straight road from an inclined road from a point of view of handling stability, or smooth running from a stopped state, reduction in shaking transmitted from a road surface, or reduction of transmission of road noises into the vehicle from a point of view of a riding comfort can be accomplished. In a luxury car, in particular, the riding comfort, handling stability and quietness in the vehicle become important, and improvement of the damping force properties upon the slight amplitude, i.e., mostly upon the high frequency vibrations or the slight amplitude, provides an absolute effect to the vehicle.

In the above description, while the example in which the cutout section 151 is continuously formed at the entire circumference to be formed in an annular shape has been described, the cutout section may be partially formed to be intermittently disposed at predetermined intervals in the circumferential direction. In this case, three or more arc-shaped cutout sections 151 may be formed at equal intervals.

In addition, the inner circumferential surfaces 138A and 139A of the diameter expanding sections 138 and 139 may have a curved surface shape, rather than the tapered shape. Further, in contrast, the friction member 22, 22' may be installed such that the bottom section 101 of the base section 92 is directed outward in the cylinder inward/outward direction. In addition, the communication passage 161 may be formed to reduce a pressure difference between both sides in the axial direction of the friction member 22, and may have a check valve. A communication groove extending in the axial direction may be formed in the inner circumferential side of the friction member 22, 22', and the communication passage 161 may be constituted by the communication groove and the piston rod 15.

In addition, in the first embodiment, while the example in which the present invention is applied to the dual tube type hydraulic shock absorber has been described, the present invention is not limited thereto but may be applied to hydraulic shock absorbers such as a mono-tube type hydraulic shock absorber, a hydraulic active suspension, and so on.

The hydraulic shock absorber of the above-mentioned first embodiment includes a cylinder in which a working fluid is hermetically sealed, a piston slidably fitted into the cylinder and configured to partition the inside of the cylinder into two chambers, a piston rod connected to the piston and is extending to the outside of the cylinder, a sealing member configured to come in sliding contact with the piston rod and prevent leakage of the working fluid to the outside of the cylinder, a friction member installed at an inner side of the cylinder than the sealing member and constituted by an annular elastic rubber section in sliding contact with the piston rod and an annular base section to which the elastic rubber section is fixed; and a communication passage configured to reduce a pressure difference between both sides in an axial direction of the friction member. The base section includes a bored disk type bottom section and a tube section extending from an outer circumferential side of the bottom section in the axial direction. The elastic rubber section is provided with a minimum inner diameter section and a diameter expanding section of both sides in the axial direction of the minimum inner diameter section formed at an inner circumferential side of the elastic rubber section. The elastic rubber section is formed with a tube section adhering section which adheres to the tube section in the outer circumferential side, and a cutout section is formed at least partially at the tube section side of an open surface opposite to a bottom section adhering surface fixed to the bottom section in the axial direction. A deepest section of the cutout section is configured to be shallower than a position in the axial direction of the minimum inner diameter section. According to the above configuration, since a depth of the cutout section becomes shallow, the compressing force to the piston rod becomes high, thereby an inclination angle of the increase of the damping force becomes large with respect to the increase of piston speed in the very low speed region. Further, until entering the hydraulic damping region, while the minimum inner diameter section configured to generate the highest compressive force is adhered to the piston rod, the friction member is deformed to rotate about the deepest section by movement of the piston rod, and thus a region in which a dynamic spring force is generated is increased without sliding with respect to the piston rod. Accordingly, the properties are varied such that the damping force is smoothly increased with respect to the increase in piston speed and smoothly connected to the hydraulic damping force, and thus good damping force properties can be obtained.

In addition, since the elastic rubber section is provided with the extending section disposed at the tube section side of the cutout section and extending to a shallower position in the axial direction than the deepest section, manufacturing thereof becomes easy.

In addition, since the extension surface of the inner circumferential section of the diameter expanding section of the bottom section adhering surface side and the inside surface in the radial direction of the cutout section approach each other in the radial direction away from the bottom section adhering surface in the axial direction, even when the elastic rubber section is compressed outward in the radial direction by the piston rod, the cutout section can be appropriately maintained and good properties described above can be obtained.

INDUSTRIAL APPLICABILITY

According to the hydraulic shock absorber, it is capable of obtaining good damping force properties.

REFERENCE SIGNS LIST 11 hydraulic shock absorber
15 piston rod
16, 17 chamber
18 piston
19 cylinder
21 sealing member
22, 22' friction member
91 elastic rubber section
92 base section
101 bottom section
102 tube section
126 tube section adhering surface
128 bottom section adhering surface
135 open surface
137, 137' minimum inner diameter section
138, 138', 139, 139' diameter expanding section
139A, 139A' inner circumferential surface (surface of diameter expanding section at a side close to bottom section adhering surface)
151 cutout section
154 inward extending surface (inside surface of cutout section in radial direction)
155 deepest section
160 extending section
161 communication passage

The invention claimed is:

1. A hydraulic shock absorber comprising:
a cylinder in which a working fluid is sealed therein;
a piston slidably fitted into the cylinder and configured to partition an inside of the cylinder into two chambers;
a piston rod connected to the piston and extending to an outside of the cylinder;
a sealing member configured to come in sliding contact with the piston rod and prevent leakage of the working fluid to the outside of the cylinder;
a friction member installed to the cylinder at inner side than the sealing member and constituted by an annular elastic rubber section in sliding contact with the piston rod and an annular base section to which the elastic rubber section is fixed; and
a communication passage configured to reduce a pressure difference between both sides in an axial direction of the friction member, wherein
the base section includes a bored disk type bottom section and a tube section extending from an outer circumferential side of the bottom section in the axial direction,
the elastic rubber section is provided with a minimum inner diameter section and a diameter expanding section of both sides in the axial direction of the minimum inner diameter section formed at an inner circumferential side of the elastic rubber section, the elastic rubber section is provided with a tube section adhering surface which adheres to the tube section at an outer circumferential side of the elastic rubber section, and a cutout section is formed at least partially at the tube section side of an open surface opposite to a bottom section adhering surface fixed to the bottom section in the axial direction, and
a deepest section of the cutout section is configured to be shallower than a position in the axial direction of the minimum inner diameter section.

2. The hydraulic shock absorber according to claim 1, wherein the elastic rubber section is provided with an extending section on the tube section side of the cutout section which extends to a shallower portion than the deepest section in the axial direction, and
an outer circumferential portion of the extending section is part of the tube section adhering surface.

3. The hydraulic shock absorber according to claim 1, wherein the elastic rubber section is configured such that an extension surface of a surface of the diameter expanding section close to the bottom section adhering surface and an inside surface of the cutout section in the axial direction may approach as being apart from the bottom section adhering surface in the axial direction.

* * * * *